US010619050B2

(12) United States Patent
Rentsch et al.

(10) Patent No.: US 10,619,050 B2
(45) Date of Patent: Apr. 14, 2020

(54) REDUCED MOISTURE PICKUP IN POLYOL-CONTAINING MINERAL FILLER PRODUCTS

(71) Applicant: Omya International AG, Oftringen (CH)

(72) Inventors: Samuel Rentsch, Spiegel bei Bern (CH); Fabio Ippolito, Oftringen (CH); Matthias Welker, Hésingue (FR); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 65 days.

(21) Appl. No.: 15/918,706

(22) Filed: Mar. 12, 2018

(65) Prior Publication Data

US 2018/0201790 A1    Jul. 19, 2018

Related U.S. Application Data

(62) Division of application No. 15/128,702, filed as application No. PCT/EP2015/058141 on Apr. 15, 2015, now Pat. No. 9,951,228.

(60) Provisional application No. 62/042,871, filed on Aug. 28, 2014.

(30) Foreign Application Priority Data

Apr. 16, 2014    (EP) .................................. 14164989

(51) Int. Cl.
| | | |
|---|---|---|
| *B32B 5/16* | (2006.01) |
| *C09C 1/02* | (2006.01) |
| *C01F 11/18* | (2006.01) |
| *C08K 9/04* | (2006.01) |
| *C09D 7/40* | (2018.01) |
| *C09D 7/62* | (2018.01) |
| *C08K 3/26* | (2006.01) |
| *D21H 17/67* | (2006.01) |
| *D21H 19/38* | (2006.01) |
| *C09C 3/08* | (2006.01) |
| *C09C 3/04* | (2006.01) |

(52) U.S. Cl.
CPC ............ *C09C 1/021* (2013.01); *C01F 11/185* (2013.01); *C08K 3/26* (2013.01); *C08K 9/04* (2013.01); *C09C 1/02* (2013.01); *C09D 7/62* (2018.01); *C09D 7/69* (2018.01); *D21H 17/675* (2013.01); *D21H 19/385* (2013.01); *C01P 2004/51* (2013.01); *C01P 2004/61* (2013.01); *C01P 2004/62* (2013.01); *C01P 2006/12* (2013.01); *C01P 2006/82* (2013.01); *C08K 2003/265* (2013.01); *C08K 2201/005* (2013.01); *C08K 2201/006* (2013.01); *C09C 3/041* (2013.01); *C09C 3/08* (2013.01)

(58) Field of Classification Search
CPC .. C09C 1/02; C09C 1/021; C09C 3/08; C08K 3/26; C08K 9/04; C08K 2003/265; C01P 2004/51; C01P 2004/62; C01P 2004/12
USPC ........................................................ 428/403
See application file for complete search history.

(56) References Cited

U.S. PATENT DOCUMENTS

| | | | |
|---|---|---|---|
| 4,328,041 A * | 5/1982 | Wilson ...................... C09C 3/08 | |
| | | | 106/429 |
| 4,407,986 A | 10/1983 | Nomura et al. | |
| 5,135,967 A | 8/1992 | Aumann et al. | |
| 7,300,974 B2 | 11/2007 | Blanchard et al. | |
| 9,951,228 B2 * | 4/2018 | Rentsch ................... C08K 9/04 | |
| 2004/0162376 A1 | 8/2004 | Blanchard et al. | |
| 2006/0042510 A1 * | 3/2006 | Craig ..................... C09C 1/3653 | |
| | | | 106/417 |
| 2006/0047023 A1 | 3/2006 | Craig et al. | |
| 2006/0148930 A1 | 7/2006 | Blanchard et al. | |
| 2007/0256598 A1 | 11/2007 | Blanchard et al. | |
| 2009/0227721 A1 | 9/2009 | Blanchard et al. | |
| 2009/0312459 A1 | 12/2009 | Gane et al. | |
| 2009/0324979 A1 * | 12/2009 | Roussel ................... B32B 7/02 | |
| | | | 428/523 |
| 2011/0245396 A1 | 10/2011 | Blanchard et al. | |
| 2012/0077917 A1 | 3/2012 | Gane et al. | |
| 2012/0237433 A1 | 9/2012 | Gane et al. | |
| 2012/0318895 A1 | 12/2012 | Buri et al. | |
| 2013/0056566 A1 | 3/2013 | Guillot et al. | |
| 2013/0143995 A1 | 6/2013 | Saunders et al. | |
| 2015/0240056 A1 * | 8/2015 | Rentsch .................. C09C 1/021 | |
| | | | 442/327 |
| 2015/0376415 A1 | 12/2015 | Guillot et al. | |

(Continued)

FOREIGN PATENT DOCUMENTS

| | | |
|---|---|---|
| DE | 958830 C | 2/1957 |
| EP | 0325114 A2 | 7/1989 |

(Continued)

OTHER PUBLICATIONS

The International Search Report dated Jun. 16, 2015 for PCT/EP2015/058141.
The Written Opinion of the International Searching Authority dated Jun. 16, 2015 for PCT/EP2015/058141.
JP2008069296A (Mar. 27, 2008)—English-language abstract from EPO/Espacenet, 1 page.
JPS52119482A (Oct. 6, 1977)—English-language abstract from EPO/Espacenet, 1 page.
JPS60123562A (Jul. 2, 1985)—English-language abstract from EPO/Espacenet, 1 page.

*Primary Examiner* — Hoa (Holly) Le
(74) *Attorney, Agent, or Firm* — ALGM LLP; Harry J. Guttman

(57) ABSTRACT

The present invention relates to a process for the production of a mineral filler product comprising a step of dry grinding a calcium carbonate-containing material in the presence of an agent being a polyol. The mineral filler product according to the present invention was found to have a reduced moisture pickup as compared to prior art products.

28 Claims, No Drawings

(56) References Cited

U.S. PATENT DOCUMENTS

2016/0251231 A1    9/2016  Gane et al.
2017/0240746 A1*  8/2017  Rentsch .................. C08K 9/04

FOREIGN PATENT DOCUMENTS

| EP | 2371766 A1 | 10/2011 |
|---|---|---|
| EP | 2447213 A1 | 5/2012 |
| EP | 2524898 A1 | 11/2012 |
| JP | S52119482 A | 10/1977 |
| JP | S60123562 A | 7/1985 |
| JP | 2008069296 A | 3/2008 |
| WO | 0020336 A1 | 4/2000 |
| WO | 2011070418 A1 | 6/2011 |
| WO | 2011077232 A1 | 6/2011 |

* cited by examiner

REDUCED MOISTURE PICKUP IN POLYOL-CONTAINING MINERAL FILLER PRODUCTS

CROSS-REFERENCE TO RELATED APPLICATIONS

This application is a Divisional of U.S. application Ser. No. 15/128,702, filed Sep. 23, 2016, which is the U.S. national phase of PCT Application No. PCT/EP2015/058141, filed Apr. 15, 2015, which claims priority to U.S. Provisional Application No. 62/042,871, filed Aug. 28, 2014 and European Application No. 14164989.7, filed Apr. 16, 2014, the contents of which are hereby incorporated by reference.

The present invention relates to a combination of a dry grinding and classification process for the production of a mineral filler product having a reduced moisture pickup.

In general, mineral filler products may be used in a multitude of applications, for example in polymer compositions (e.g., polyolefin films), in paper making, paper coatings, agricultural applications, paints, adhesives, sealants, construction applications, or cosmetic applications. Well-known mineral fillers comprise, for example, natural ground calcium carbonate (GCC) and precipitated calcium carbonate (PCC).

For the preparation of ground calcium carbonate it has been quite common to use agents, such as grinding agents or dispersing agents, in order to improve the grinding and/or dispersing efficiency. Such agents may be selected, for example, from polymers such as polyalkylene glycols (e.g., polyethylene glycol). Some publications also describe monomeric polyols (e.g., ethylene glycol, propylene glycol or glycerol etc.) to be suitable as grinding or dispersing agents, especially during dry grinding.

In EP 2 029 677, a process for dry grinding a material containing a carbonate ore is described, said process includes the steps of dry grinding said material in at least one grinding unit in the presence of at least one polyalkylene glycol polymer in such manner that the quantity of water in the grinding unit is less than 10.0 wt.-%, based on the dry material in said grinding unit. The process may further comprise an optional classifying step, wherein both the grinding step and the latter classifying step may be carried out repeatedly with all or part of the material obtained in the dry grinding step and/or in the classifying step.

EP 2 132 268 provides a method for dry grinding of one or more mineral materials which include at least one calcium carbonate. The method includes the steps of crushing the mineral material(s) in at least one crushing unit, dry grinding the crushed material in at least one grinding unit in the presence of a comb-type hydrophilic polymer containing at least one polyalkylene oxide, wherein the quantity of liquid in the grinding unit is less than 15.0 wt.-%, based on the dry material crushed in said crushing unit. The process may further comprise an optional classifying step, wherein both the grinding step and the latter classifying step may be carried out repeatedly with all or part of the material obtained in the dry grinding step and/or in the classifying step.

WO 2011/077232 relates to the use of formulations containing glycerol and/or polyglycerols as an agent during dry grinding to improve the self-dispersing properties of said mineral material in an aqueous composition. The viscosity of the final composition is thus reduced and kept stable over time. Furthermore, the amount of foam formed during the dispersing step is reduced.

WO 2011/070418 relates to a method for classifying mineral material, using a classification assisting additive that contains glycerol and/or at least one polyglycerol and allows air classification effectiveness to be increased or uses less specific classification energy than additive-free air classification, while obtaining a classified mineral material that is compatible with use in an aqueous medium. The invention also relates to the use of the resulting product in paints, plastics, food and feed, pharmaceutical formulations, paper mass and paper coatings.

Attempts have also been made to improve the applicability of mineral filler products and especially calcium carbonate-containing mineral filler products, e.g., by treating particulate calcium carbonates with higher aliphatic carboxylic acids, which in some cases may also be referred to as fatty acids, and aliphatic carboxylic acid salts.

For instance, WO 00/20336 relates to an ultrafine natural calcium carbonate which may optionally be treated with one or more several fatty acids or one or more several salts, or mixtures thereof, and which is used as a rheology regulator for polymer compositions.

Likewise, U.S. Pat. No. 4,407,986 relates to a precipitated calcium carbonate that is surface treated with a dispersant that may include higher aliphatic acids and their metal salts in order to limit the addition of lubricant additives when kneading this calcium carbonate with crystalline polypropylene and to avoid the formation of calcium carbonate aggregates that limit the impact strength of the polypropylene.

In EP 0 325 114 relating to non-sagging underseal compositions for motor vehicles based on polyvinyl chloride which has improved rheological and adhesion properties, a mixture of an ammonium salt of 12-hydroxystearic acid in combination with a fatty acid (in a weight ratio of 1:1) is used to treat a mineral filler.

German patent DE 958 830 relates to a process for the treatment of natural calcium carbonate in the presence of, for example, fatty acids, fatty alcohols, and fatty amides which are used as a dry grinding aid in order to avoid formation of filler adhesions on the grinding chamber wall.

Unpublished European patent application No. 12 188739.2 relates to a process for preparing a surface treated filler material product with monosubstituted succinic anhydride(s) and, optionally, with monosubstituted succinic acids.

Moreover, particulate mineral materials may also be treated with other surface treatment agents, such as silanes, siloxanes, phosphates, phosphonates, oxalates, fluorides, or mixtures thereof in order to hydrophobize the surface of said mineral material.

In many cases, the preparation of calcium carbonate-containing mineral filler products by use of the aforementioned grinding and treatment agents leads to a poor quality. For example, the use of agents, such as monomeric polyols or polyalkylene glycols, often results in a high moisture pick up susceptibility of the resulting mineral filler product. The use of particulate calcium carbonate-containing materials having high moisture pick up susceptibilities may be disadvantageous when used as a filler in polymer compositions. For example, such materials may pick up moisture during storage, transportation, and processing which, in turn, may lead to the formation of voids in polymer compositions produced in a melt extrusion process.

In view of the foregoing, the expert is still faced with the problem of efficient production of dry ground fillers for the application in plastics, such as polyolefins, without a decrease in quality. For example, the absence of grinding agents and dispersants in dry grinding operations results in a low throughput and low grinding efficiency which, in turn, leads to an overall increase in energy consumption.

Therefore, there is still a need to provide mineral filler products and processes for their preparation which may reduce or avoid one or more of the aforementioned technical drawbacks.

It is thus an object of the present invention to provide a process for the preparation of a mineral filler product which may be carried under high throughput and at high grinding efficiency. Another object may also be seen in the provision of a more efficient dry grinding process for the provision of a mineral filler product having a reduced moisture pick up.

One or more of the foregoing and other problems are solved by the subject-matter as defined herein in the independent claims.

A first aspect of the present invention relates to a process for the preparation of a mineral filler product, the process comprising the steps of:

(a) providing a calcium carbonate-containing material;
(b) providing at least one agent being a polyol;
(c) dry grinding the calcium carbonate-containing material in a mixture comprising:
  (i) the calcium carbonate-containing material provided in step (a); and
  (ii) the at least one agent provided in step (b) in at least one grinding unit to obtain a dry ground calcium carbonate-containing material;
(d) classifying the dry ground calcium carbonate-containing material of step (c) to obtain one or more coarse fractions and one or more fine fractions, wherein one or more of the coarse fractions are removed and/or subjected to dry grinding step (c) and/or subjected to classifying step (d); and
(e) treating the calcium carbonate-containing material before and/or during and/or after step (c) with at least one monosubstituted succinic anhydride and, optionally, with at least one monosubstituted succinic acid and/or salt(s) thereof, to obtain a calcium carbonate-containing material having a treatment layer on at least part of the surface of said material;
wherein the total amount of the at least one agent provided in step (b) ranges from 0.01 to 5.0 wt.-%, based on the total dry weight of the calcium carbonate-containing material provided in step (a);
the total moisture content in the mixture of step (c) is less than or equal to 5.0 wt.-%, based on the total weight of said mixture;
the total amount of the at least one monosubstituted succinic anhydride and the optional at least one monosubstituted succinic acid and/or salt(s) thereof in step (e) ranges from 0.01 to 5.0 wt.-%, based on the total dry weight of the calcium carbonate-containing material provided in step (a); and
the temperature in step (e) is adjusted to at least 2° C. above the melting point of the at least one monosubstituted succinic anhydride.

According to the process of the present invention, a mineral filler product is obtained by dry grinding a calcium carbonate-containing material in the presence of a polyol, for example glycerol. The dry ground calcium carbonate-containing material is then classified to obtain one or more coarse fractions and one or more fine fractions. One or more of the coarse fractions may be removed from the process. Alternatively, one or more of the coarse fractions may be subjected to dry grinding step (c), classifying step (d) or both. The process according to the present invention further comprises a treatment step, referred to as step (e), using a hydrophobizing agent selected from at least one monosubstituted succinic anhydride and, optionally, at least one monosubstituted succinic acid and/or salt(s) thereof. In said treatment step, a treatment layer is formed on at least part of the surface of the calcium carbonate-containing material upon heating the calcium carbonate-containing material together with the hydrophobizing agent. The treatment step may be carried out before and/or during and/or after dry grinding step (c) meaning that the hydrophobizing agent is contacted with the calcium carbonate-containing material of step (a) and/or the dry ground calcium carbonate-containing material obtained during or after step (c). Likewise, the hydrophobizing agent may be applied to any of the fractions obtained in classifying step (d), preferably one or more of the fine fractions.

Another aspect of the present invention relates to a mineral filler product. Said product is obtainable by the process according to the present invention.

It should be understood that for the purposes of the present invention, the following terms have the following meanings:

The term "filler" in the meaning of the present invention refers to substances which may be added to materials, such as polymers, elastomers, paints, or adhesives, e.g., to lower the consumption of more expensive materials or to improve material or mechanical properties of the resulting products. The person skilled in the art very well knows the fillers, typically mineral fillers, used in the respective field.

A "natural calcium carbonate source" may be any natural material comprising calcium carbonate. Such materials comprise, for example, calcite, marble, limestone, chalk, dolomite, and the like.

The term "polyol" as used herein refers to any organic compound being substituted with at least two hydroxy groups, whereof two or more hydroxy groups are each bound to another carbon atom. It is to be understood that such a polyol may be monomeric (e.g., glycerol, ethylene glycol, propylene glycol, triethanolamine, or triisopropanolamine), oligomeric (e.g., diethylene glycol, triethylene glycol, dipropylene glycol, tripropylene glycol, diglycerol, or triglycerol), or polymeric (e.g., homo- or heteropolymers of ethylene glycol, propylene glycol, or glycerol).

The term "dry ground" or "dry grinding" in the meaning of the present invention refers to the comminution of a solid material by using a mill (e.g., by means of a ball mill), wherein said material to be ground has a total moisture content of less than or equal to 5.0 wt.-%, based on the total weight of said material.

The terms "coarse" and "fine" as used herein describe the particle size of two fractions of a particulate material relative to each other and, thus, do not imply a specific particle size or size range. Unless indicated otherwise, both terms refer to the relative weight median particle sizes $d_{50}$. In this respect, the term "fine fraction" indicates that the weight median particle size $d_{50}$ of said fraction is smaller than the weight median particle size $d_{50}$ of the corresponding "coarse fraction".

Throughout the present application, the particle size of a fraction of a particulate material is described by its particle size distribution. The value $d_x$ represents the diameter relative to which x % by weight of the particles have diameters less than $d_x$. This means, for example, that the $d_{98}$ value (also referred to as the "topcut") is the particle size at which 98 wt.-% of all particles of a fraction are smaller than the indicated value. The $d_{50}$ value is thus the "weight median particle size" at which 50 wt.-% of all particles are smaller than the indicated particle size. Particle sizes defined within the present application being smaller than 100 μm can be determined based on measurements made by using a Sedigraph™ 5100 instrument of Micromeritics Instrument Corporation. The method and the instrument are known to the skilled person and are commonly used to determine the particle size of fillers and pigments. The measurements are carried out in an aqueous solution of 0.1 wt.-% $Na_4P_2O_7$. Samples are dispersed using a high speed stirrer and supersonics. In case of surface-treated products, additional 0.5 g of a surfactant (Photo-Flo 200® from Kodak) are added to 50 ml of the solution of 0.1 wt.-% $Na_4P_2O_7$ before dispersing the treated carbonate sample. In case of particle sizes being larger than 100 μm, fractional sieving according to the ISO 3310-1:2000 standard is used to determine particle size distributions.

The term "succinic anhydride", also called dihydro-2,5-furandione, succinic acid anhydride or succinyl oxide, has the molecular formula $C_4H_4O_3$ and is the acid anhydride of succinic acid.

The term "monosubstituted succinic anhydride" in the meaning of the present invention refers to a succinic anhydride substituted with one substituent (R):

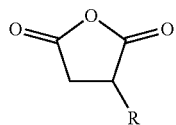

The term "monosubstituted succinic acid" in the meaning of the present invention refers to a succinic acid substituted with one substituent (R):

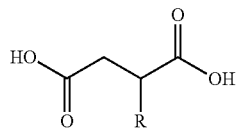

The "total moisture content" of a material refers to the percentage of moisture (i.e. water) which may be desorbed from a sample upon heating to 220° C. The total moisture contents as defined herein can be measured according to the Karl Fischer coulometric titration method, desorbing the moisture in an oven at 220° C. for 10 min and passing it continuously into a KF coulometer (Mettler Toledo coulometric KF Titrator C30, combined with Mettler oven DO 0337) using dry nitrogen at 100 ml/min for 10 min. A calibration curve using water has to be recorded and a blank of 10 min nitrogen flow without a sample has to be taken into account.

The "melting point" of all compounds referred to herein can be measured with an OptiMelt MPA100 device from SRS Stanford Research Systems, Sunnyvale, USA.

The "moisture pick up susceptibility" of a material refers to the amount of moisture absorbed on the surface of said material within a certain time upon exposure to a defined humid atmosphere and is expressed in mg/g. The "normalized moisture pick up susceptibility" of a material also refers to the amount of moisture absorbed on the surface of said material within a certain time upon exposure to a defined humid atmosphere and is expressed in mg/m². The moisture pick up susceptibility can be determined in mg moisture/g after exposure to an atmosphere of 10 and 85% relative humidity, respectively, for each 2.5 h at a temperature of +23° C. (±2° C.). For this purpose, the sample is first kept at an atmosphere of 10% relative humidity for 2.5 h, then the atmosphere is changed to 85% relative humidity at which the sample is kept for another 2.5 hours. The weight increase between 10 and 85% relative humidity is then used to calculate the moisture pick-up in mg moisture/g of sample. The moisture pick up susceptibility in mg/g divided by the specific surface area in m² (BET method) corresponds to the normalized moisture pick up susceptibility expressed in mg/m² of sample.

Throughout the present document, the "specific surface area" (expressed in m²/g) of a mineral filler is determined using the BET method (using nitrogen as adsorbing gas), which is well known to the skilled person (ISO 9277:1995). The total surface area (in m²) of the mineral filler can be obtained by multiplication of the specific surface area (in m²/g) and the mass (in g) of the mineral filler.

Where an indefinite or definite article is used when referring to a singular noun, e.g., "a", "an" or "the", this includes a plural of that noun unless anything else is specifically stated.

Where the term "comprising" is used in the present description and claims, it does not exclude other elements. For the purposes of the present invention, the term "consisting of" is considered to be a preferred embodiment of the term "comprising". If hereinafter a group is defined to comprise at least a certain number of embodiments, this is also to be understood to disclose a group, which preferably consists only of these embodiments.

Terms like "obtainable" or "definable" and "obtained" or "defined" are used interchangeably. This, e.g., means that, unless the context clearly dictates otherwise, the term "obtained" does not mean to indicate that, e.g., an embodiment must be obtained by, e.g., the sequence of steps following the term "obtained" though such a limited understanding is always included by the terms "obtained" or "defined" as a preferred embodiment.

Whenever the terms "including" or "having" are used, these terms are meant to be equivalent to "comprising" as defined hereinabove.

Advantageous embodiments of the process according to the present invention and embodiments of the mineral filler product obtainable by the process according to the present invention are defined in the corresponding subclaims.

According to one embodiment, the calcium carbonate-containing material provided in step (a) is selected from natural calcium carbonate sources and preferably is selected from the group consisting of calcite, marble, limestone, chalk, dolomite, and mixtures thereof.

According to another embodiment, the at least one agent provided in step (b) is a polyol selected from the group consisting of saccharides, glycerol, polyglycerol, ethylene glycol, propylene glycol, oligomers and polymers of ethylene glycol and/or propylene glycol, and triisopropanolamine, preferably said at least one agent is a polyol selected from glycerol and triisopropanolamine.

According to still another embodiment, the total amount of the at least one agent provided in step (b) ranges from 0.05 to 3.0 wt.-%, preferably from 0.1 to 2.0 wt.-%, and more preferably from 0.15 to 1.5 wt.-%, based on the total dry weight of the calcium carbonate-containing material provided in step (a).

According to still another embodiment, the total moisture content in the mixture of step (c) is less than or equal to 2.0 wt.-%, preferably less than or equal to 1.5 wt.-%, and more preferably less than or equal to 1.0 wt.-%, based on the total weight of said mixture.

According to one embodiment, the at least one monosubstituted succinic anhydride of step (e) consists of succinic anhydride monosubstituted with an aliphatic group having a total amount of carbon atoms from C2 to C30, preferably from C3 to C25, and most preferably from C4 to C20.

According to another embodiment, the at least one monosubstituted succinic anhydride of step (e) is at least one alkyl monosubstituted succinic anhydride, preferably at least one alkyl monosubstituted succinic anhydride selected from the group consisting of ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, and octadecanyl succinic anhydride.

According to another embodiment, the at least one monosubstituted succinic anhydride of step (e) is at least one alkenyl monosubstituted succinic anhydride, preferably at least one alkenyl monosubstituted succinic anhydride selected from the group consisting of ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, and octadecenyl succinic anhydride.

According to still another embodiment, the temperature during step (e) ranges from 30° C. to 200° C., preferably from 80° C. to 150° C., and more preferably from 110° C. to 130° C.

According to still another embodiment, the temperature in step (e) is adjusted to at least 2° C. above the melting point of the at least one monosubstituted succinic anhydride for less than 1 h, preferably less than 5 min, more preferably less than 1 min, and most preferably 1 to 10 s.

According to another embodiment, the total amount of the at least one monosubstituted succinic anhydride and the optional at least one monosubstituted succinic acid and/or salt(s) thereof in step (e) ranges from 0.05 to 3.0 wt.-%, preferably from 0.1 to 2.0 wt.-%, and more preferably from 0.15 to 1.5 wt.-%, based on the total dry weight of the calcium carbonate-containing material provided in step (a).

According to another embodiment, said treatment layer of step (e) comprises the at least one monosubstituted succinic anhydride and/or reaction product(s) thereof and the optional at least one monosubstituted succinic acid and/or salt(s) thereof and/or reaction product(s) thereof in a total amount of from 0.01 to 2.0 wt.-%, preferably from 0.05 to 1.5 wt.-%, and more preferably from 0.1 to 1.0 wt.-%, based on the total dry weight of the calcium carbonate-containing material.

According to still another embodiment, the mineral filler product has a weight median particle size $d_{50}$ ranging from 0.3 to 25.0 µm, preferably from 0.5 to 10.0 µm, more preferably from 1.0 to 8.0 µm, and most preferably from 1.2 to 5.0 µm.

According to still another embodiment, the mineral filler product has a specific surface area ranging from 0.5 to 20.0 $m^2/g$, preferably from 1.0 to 10.0 $m^2/g$, and more preferably from 2.0 to 8.0 $m^2/g$ as measured by the BET nitrogen method.

The process according to the present invention comprises the steps of dry grinding a calcium carbonate-containing material in the presence of an agent being a polyol and a step of treating the calcium carbonate-containing material with at least one monosubstituted succinic anhydride and, optionally, with at least one monosubstituted succinic acid and/or salt(s) thereof.

The inventors surprisingly found that the mineral filler product obtainable by the process according to the present invention provides several advantages. Accordingly, the problems described hereinabove with respect to the prior art may be solved by the process according to the present invention using an agent selected from polyols which may be seen as a grinding or dispersing agent together with a hydrophobizing agent as defined herein in the claims. The use of a polyol during dry grinding step (c) may result in higher mill capacities and a higher throughput which requires lower investments and smaller plant footprints for equal production capacities.

It was further found that the specific combination of an agent being a polyol during dry grinding together with at least one monosubstituted succinic anhydride used in a treatment step is of particular advantage.

The treatment layer formed in said treatment step leads to a moisture pick up (measured as the moisture pickup susceptibility) of the final mineral filler product which is significantly reduced as compared to prior art treatment methods using, for example, stearic acid.

Calcium carbonate-containing materials showing a reduced moisture pick up may be particularly suitable as a filler in polymer compositions. Such fillers do not significantly pick up moisture during storage, transportation, and/or processing which, in turn, may lead to reduced void formation in polymer compositions produced, for example, in a melt extrusion process.

In the following, preferred embodiments of the process according to the present invention for the preparation of a mineral filler product will be discussed in more detail.

It is to be understood that these details and embodiments also apply to the mineral filler product itself.

Step (a)—the Calcium Carbonate-Containing Material

According to step (a) of the process according to the present invention, a calcium carbonate-containing material is provided. In general, said calcium carbonate-containing material may be any calcium carbonate source and may be of natural or synthetic origin.

In some embodiments of the process according to the present invention, the calcium carbonate-containing material provided in step (a) is selected from natural calcium carbonate sources, preferably containing from 50.0 to 99.9 wt.-% of calcium carbonate, based on the total dry weight of said calcium carbonate-containing material.

According to one embodiment, the calcium carbonate-containing material provided in step (a) contains at least 50.0 wt.-%, preferably at least 70.0 wt.-%, more preferably at least 80.0 wt.-%, even more preferably at least 90.0 wt.-%, and most preferably from 90.0 to 99.9 wt.-% of calcium carbonate, based on the total dry weight of said calcium carbonate-containing material.

According to another embodiment, the calcium carbonate-containing material provided in step (a) is selected from the group consisting of calcite, marble, limestone, chalk, dolomite, and mixtures thereof.

According to a preferred embodiment, the calcium carbonate-containing material provided in step (a) is selected from the group consisting of calcite, marble, limestone, chalk, and mixtures thereof.

In cases where the calcium carbonate is of synthetic origin, the calcium carbonate-containing material may be precipitated calcium carbonate (PCC). PCC in the meaning of the present invention is a synthesized material, generally obtained by precipitation following a reaction of carbon dioxide and calcium hydroxide (hydrated lime) in an aqueous environment or by precipitation of a calcium- and a carbonate source in water. Additionally, precipitated calcium carbonate can also be the product of introducing calcium and carbonate salts, calcium chloride and sodium carbonate, for example, in an aqueous environment. PCC may be vaterite, calcite or aragonite. PCCs are described, for example, in EP 2 447 213, EP 2 524 898, EP 2 371 766.

Suitably, the calcium carbonate-containing material of step (a) is provided as a solid material being in particulate form. In this respect, the calcium carbonate-containing material provided in step (a) may have any particle size distribution allowing the material to be subjected to a dry grinding step. Therefore, the calcium carbonate-containing material may be provided as a comminuted material, for example, in crushed or preground form.

According to one embodiment, the calcium carbonate-containing material provided in step (a) may have a weight median particle size $d_{50}$ ranging from 5.0 to 600.0 µm, preferably from 10.0 to 500.0 µm, and more preferably from 50.0 to 300.0 µm.

In some embodiments of the present invention, the calcium carbonate-containing material may also have a specific total moisture content.

According to one embodiment, the calcium carbonate-containing material provided in step (a) has a total moisture content of from 0.01 to 1.0 wt.-%, preferably from 0.02 to 0.5 wt.-%, more preferably from 0.03 to 0.2 wt.-%, and most preferably from 0.05 to 0.1 wt.-%, based on the total dry weight of the calcium carbonate-containing material.

If necessary, the total moisture content of the calcium carbonate-containing material provided in step (a) can be adjusted, for example by drying, to specific values (e.g., the values specified above) prior to subjecting same to dry grinding step (c).

Step (b)—the Polyol Agent

According to step (b) of the process according to the present invention, an agent being a polyol is provided.

Said agent provided in step (b) serves as an additive to improve the grinding properties and also serves to avoid the formation of agglomerates which may lead to a poor separation accuracy in the subsequent classifying step.

As already described hereinabove, a polyol in the meaning of the present invention may be any organic compound being substituted with at least two hydroxy groups, whereof two or more hydroxy groups are each bound to another carbon atom. It is to be understood that such a polyol may be monomeric (e.g., glycerol, ethylene glycol, propylene glycol, or triisopropanolamine), oligomeric (e.g., diethylene glycol, triethylene glycol, dipropylene glycol, or tripropylene glycol), or polymeric (e.g., homo- or heteropolymers of ethylene glycol, propylene glycol, or glycerol).

Therefore, in one embodiment, the polyol of step (b) is an organic compound being substituted with at least two hydroxy groups, whereof two or more hydroxy groups are each bound to another carbon atom.

According to another embodiment, the polyol of step (b) is a monomeric polyol, preferably a monomeric organic compound being substituted with at least two hydroxy groups, whereof two or more hydroxy groups are each bound to another carbon atom.

In another embodiment, the polyol of step (b) is an oligomeric or polymeric polyol, preferably an oligomeric or polymeric organic compound being substituted with at least two hydroxy groups, whereof two or more hydroxy groups are each bound to another carbon atom.

In cases where the polyol of step (b) is an oligomeric or polymeric polyol, said polyol may be selected from homooligomers, heterooligomers, homopolymers, or heteropolymers of ethylene glycol, propylene glycol, or glycerol.

However, in many embodiments the polyol may be independently selected from monomeric, oligomeric, or polymeric polyols.

According to one embodiment, the at least one agent provided in step (b) is a polyol selected from the group consisting of saccharides, glycerol, polyglycerol, ethylene glycol, propylene glycol, oligomers and polymers of ethylene glycol and/or propylene glycol, and triisopropanolamine.

According to another embodiment, the at least one agent provided in step (b) is a polyol selected from the group consisting of glycerol, ethylene glycol, propylene glycol, and triisopropanolamine.

In another embodiment, the at least one agent provided in step (b) is a polyol selected from glycerol and triisopropanolamine, preferably said at least one agent is glycerol.

Saccharides which are suitable to be used as the at least one agent provided in step (b) may be selected from monosaccharides (e.g., glucose and sorbitol), disaccharides (e.g., sucrose), oligosaccharides, and polysaccharides (e.g., starch, cellulose, and derivatives of both), wherein monosaccharides and disaccharides are preferred.

Therefore, in one embodiment, the saccharides are selected from monosaccharides and disaccharides, preferably sorbitol and saccharose.

Another requirement of the process according to the present invention is the total amount of the at least one agent provided in step (b). In general, said total amount may range from 0.01 to 10.0 wt.-%, based on the total dry weight of the calcium carbonate-containing material provided in step (a).

However, it is preferred to use relatively small amounts of said at least one agent as large amounts of polyols may result in an increase of the moisture pickup.

Therefore, in one embodiment, the total amount of the at least one agent provided in step (b) may range from 0.01 to 5.0 wt.-%, based on the total dry weight of the calcium carbonate-containing material provided in step (a).

In another embodiment of the inventive process, the total amount of the at least one agent provided in step (b) ranges from 0.05 to 3.0 wt.-%, preferably from 0.1 to 2.0 wt.-%, and more preferably from 0.15 to 1.5 wt.-%, based on the total dry weight of the calcium carbonate-containing material provided in step (a).

Step (c)—Dry Grinding

According to step (c) of the process according to the present invention, a mixture comprising the calcium carbonate-containing material provided in step (a) and the at least one agent provided in step (b) is dry ground in at least one grinding unit to obtain a dry ground calcium carbonate-containing material.

The term "dry ground" or "dry grinding" in the meaning of the present invention refers to the comminution of a solid material by using a mill (e.g., by means of a ball mill), wherein said material to be ground has a total moisture content of less than or equal to 5.0 wt.-%, based on the total weight of said material.

For the purposes of the present invention, any suitable mill known in the art may be used, for example a ball mill, semi-autogenous mill, or autogenous mill. However, said at least one grinding unit preferably is a ball mill.

It has also to be noted that step (c) is carried out by using at least one grinding unit, i.e. it is also possible to grind the calcium carbonate-containing material in one or more steps by using a series or cascade of grinding units which may be selected, for example, from any of the foregoing mill types.

The amount of water being present in the mixture to be dry ground may be expressed by the total moisture content which is based on the total weight of said mixture. Typically, dry grinding processes are carried using mixtures having a total moisture content of less than or equal to 5.0 wt.-%, based on the total weight of said mixture.

However, in some cases it may also be advantageous if said mixture to be ground contains traces of water meaning that the mixture may have a lower total moisture content limit of, for example, 0.01, 0.02, 0.03, or 0.05 wt.-%, based on the total weight of said mixture. Such traces of water or moisture may be useful for the formation of the treatment layer during treatment step (e), for example by triggering the hydrolysis of anhydride units.

According to one embodiment, the total moisture content in the mixture of step (c) is less than or equal to 2.0 wt.-%, preferably less than or equal to 1.5 wt.-%, and more preferably less than or equal to 1.0 wt.-%, based on the total weight of said mixture, wherein the total moisture content in the mixture of step (c) preferably has a lower limit of 0.03 wt.-%, based on the total weight of said mixture.

According to another embodiment, the total moisture content in the mixture of step (c) ranges from 0.01 to 1.0 wt.-%, preferably from 0.02 to 0.5 wt.-%, more preferably from 0.03 to 0.2 wt.-%, and most preferably from 0.05 to 0.1 wt.-%, based on the total weight of said mixture.

Step (c) describes the dry grinding of a mixture comprising the calcium carbonate-containing material provided in step (a) and the at least one agent provided in step (b).

In this respect, it is possible to obtain the mixture to be ground in step (c) of the process according to the present invention by contacting with each other the components provided in steps (a) and (b) before or during grinding step (c). In addition, it is also possible to obtain said mixture by contacting with each other the components in one or more portions before or during dry grinding step (c).

According to one embodiment, the mixture of dry grinding step (c) is obtained before said grinding step by simultaneously contacting the calcium carbonate-containing material provided in step (a) with the at least one agent provided in step (b). According to another embodiment, the mixture of grinding step (c) is obtained before said grinding step by simultaneously contacting the calcium carbonate-containing material provided in step (a) with a first portion of the at least one agent provided in step (b), wherein a second portion of the at least one agent is added during grinding step (c).

In one embodiment, the dry ground calcium carbonate-containing material obtained after dry grinding step (c) has a weight median particle size $d_{50}$ ranging from 0.5 to 100.0 µm, preferably from 1.0 to 50.0 µm, and more preferably from 2.0 to 20.0 µm.

In addition or alternatively to the foregoing weight median particle sizes, the dry ground calcium carbonate-containing material obtained after dry grinding step (c) may have a particle size topcut $d_{98}$ ranging from 1.5 to 250.0 µm, preferably from 2.0 to 130.0 µm, and more preferably from 2.5 to 25.0 µm.

Step (d)—Classifying

Step (d) of the process according to the present invention is a classifying step. In said classifying step, one or more coarse fractions and one or more fine fractions are obtained, wherein one or more of the coarse fractions are removed and/or subjected to dry grinding step (c) and/or subjected to classifying step (d).

A classifying step in general serves to divide a feed fraction having a certain particle size distribution into a coarse fraction and a fine fraction each having different particle size distributions. Typically, the coarse fraction has a $d_{50}$ value being higher than that of the feed fraction, whereas the fine fraction has a $d_{50}$ value being smaller than that of the feed fraction.

For this purpose, screening devices as well as gravity-based devices, such as centrifuges or cyclones, and any combination of the aforementioned devices may be used. In this respect, it has to be noted that it is also possible to use a series or cascade of any of the aforementioned classifying devices in any combination.

In one embodiment, classifying step (e) is carried out by use of one or more cyclones. Optionally, said one or more cyclones are used in combination with one or more screens.

As defined in process step (d), one or more of the coarse fractions obtained after classifying the calcium carbonate-containing material may be removed and/or subjected to dry grinding step (c) and/or subjected to classifying step (d).

In cases where one or more of the coarse fractions obtained in classifying step (d) are subjected to dry grinding step (c) and/or again subjected to classifying step (d), the inventive process can be considered as a closed circuit grinding, wherein a part or any of the one or more coarse fractions may be subjected to either one or both of the foregoing process steps. For example, part or any of the one or more coarse fractions may be ground in at least one grinding unit of a cascade of grinding units in step (c). Additionally or alternatively, part or any of the one or more coarse fractions may be classified in at least one classifying device of a cascade of classifying devices in step (d).

Depending on the particle size distribution of the one or more coarse fractions, it is also possible to subject a part of the one or more coarse fractions to classifying step (d), whereas the remaining coarse fractions are subjected to dry grinding step (c). For example, if two coarse fractions are obtained in classifying step (d), the coarse fraction containing relatively large particles may be sent back to at least one grinding unit of dry grinding step (c), whereas the coarse fraction containing relatively small particles may be repeatedly subjected to classifying step (d).

In cases where one or more of the coarse fractions obtained in classifying step (d) are removed, this means that these removed coarse fractions are recycled neither in grinding step (c) nor in classifying step (d). Depending on the particle size distribution of the one or more coarse fractions, it is also possible to remove one part of the one or more coarse fractions, whereas another part is subjected to dry grinding step (c) and still another part of the coarse fractions is subjected to classifying step (d). For example, if three coarse fractions are obtained in classifying step (d), the coarse fraction containing the largest particles may be removed, whereas the coarse fraction containing medium size particles may be sent back to the at least one grinding unit of dry grinding step (c) and the coarse fraction containing the smallest particles may be repeatedly subjected to classifying step (d).

However, it is still possible to subject the removed coarse fractions to another grinding step or classifying step in a parallel process stream, wherein the latter grinding and classifying steps may also include the use of a series or cascade of the corresponding devices in one or more steps. It is further possible to add part or all of the material obtained in said parallel process stream to the main process stream defined herein in the independent claim.

Alternatively, it also possible to completely remove part or all of the one or more coarse fractions obtained in classifying step (d) in a waste stream.

Depending on the order of steps (c) to (e), the one or more fine fractions obtained after classifying step (e) may represent the final product of the inventive process, i.e. the mineral filler product.

Therefore, according to one embodiment, the one or more fine fractions obtained in classifying step (d) have a weight median particle size $d_{50}$ ranging from 0.3 to 25.0 µm, preferably from 0.5 to 10.0 µm, more preferably from 1.0 to 8.0 µm, and most preferably from 1.2 to 5.0 µm, for example from 1.5 to 1.7 µm.

In addition or alternatively to the foregoing weight median particle sizes, the one or more fine fractions obtained in classifying step (d) may have a particle size topcut $d_{98}$ ranging from 0.5 to 30.0 µm, preferably from 1.0 to 20.0 µm, and more preferably from 1.5 to 15.0 µm.

Step (e)—Surface Treatment

In step (e) of the process according to the present invention, the calcium carbonate-containing material is treated before and/or during and/or after step (c) with at least one monosubstituted succinic anhydride to obtain a calcium carbonate-containing material having a treatment layer on at least part of the surface of said material.

It is appreciated that the expression "at least one" monosubstituted succinic anhydride means that one or more kinds of monosubstituted succinic anhydride may be provided in the process of the present invention.

Accordingly, it should be noted that the at least one monosubstituted succinic anhydride may be one kind of monosubstituted succinic anhydride. Alternatively, the at least one monosubstituted succinic anhydride may be a mixture of two or more kinds of monosubstituted succinic anhydride. For example, the at least one monosubstituted succinic anhydride may be a mixture of two or three kinds of monosubstituted succinic anhydride, like two kinds of monosubstituted succinic anhydride.

In one embodiment of the present invention, the at least one monosubstituted succinic anhydride is one kind of monosubstituted succinic anhydride.

It is appreciated that the at least one monosubstituted succinic anhydride represents a surface treatment agent and consists of succinic anhydride monosubstituted with an aliphatic group having a total amount of carbon atoms from C2 to C30 in the substituent.

The term "aliphatic group" in the meaning of the present invention refers a non-aromatic group containing only carbon and hydrogen. Accordingly, said term encompasses acyclic and cyclic hydrocarbons which may be both saturated and unsaturated. Additionally, aliphatic groups (e.g., acyclic aliphatic groups) may have a linear or branched structure (e.g., linear or branched aliphatic groups). The skilled person will thus appreciate that any branched group being part of one of the embodiments defined within this application has a total amount of carbon atoms of at least C3.

In one embodiment of the present invention, the at least one monosubstituted succinic anhydride consists of succinic anhydride monosubstituted with an aliphatic group having a total amount of carbon atoms from C3 to C20 in the substituent. For example, the at least one monosubstituted succinic anhydride consists of succinic anhydride monosubstituted with an aliphatic group having a total amount of carbon atoms from C4 to C18 in the substituent.

In another embodiment of the present invention, the at least one monosubstituted succinic anhydride consists of succinic anhydride monosubstituted with one group being a linear aliphatic group having a total amount of carbon atoms from C2 to C30, preferably from C3 to C20, and most preferably from C4 to C18 in the substituent.

Alternatively, the at least one monosubstituted succinic anhydride consists of succinic anhydride monosubstituted with one group being a branched aliphatic group having a total amount of carbon atoms from C3 to C30, preferably from C3 to C20, and most preferably from C4 to C18 in the substituent.

Thus, it is preferred that the at least one monosubstituted succinic anhydride consists of succinic anhydride monosubstituted with one group being a linear or branched alkyl group having a total amount of carbon atoms from C2 to C30, preferably from C3 to C20 and most preferably from C4 to C18 in the substituent.

For example, the at least one monosubstituted succinic anhydride consists of succinic anhydride monosubstituted with one group being a linear alkyl group having a total amount of carbon atoms from C2 to C30, preferably from C3 to C20, and most preferably from C4 to C18 in the substituent. Alternatively, the at least one monosubstituted succinic anhydride consists of succinic anhydride monosubstituted with one group being a branched alkyl group having a total amount of carbon atoms from C3 to C30, preferably from C3 to C20, and most preferably from C4 to C18 in the substituent.

The term "alkyl" in the meaning of the present invention refers to a linear or branched saturated organic compound containing only carbon and hydrogen. In other words, "alkyl monosubstituted succinic anhydrides" are composed of linear or branched saturated hydrocarbon chains containing a pendant succinic anhydride group.

In one embodiment of the present invention, the at least one monosubstituted succinic anhydride is at least one linear or branched alkyl monosubstituted succinic anhydride. For example, the at least one alkyl monosubstituted succinic anhydride is selected from the group consisting of ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, and octadecanyl succinic anhydride.

Accordingly, it is appreciated that, e.g., the term "butylsuccinic anhydride" comprises linear and branched butylsuccinic anhydride(s). One specific example of linear butylsuccinic anhydride(s) is n-butylsuccinic anhydride. Other specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Other specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that, e.g., the term "octadecanyl succinic anhydride" comprises linear and branched octadecanyl succinic anhydride(s). One specific example of linear octadecanyl succinic anhydride(s) is n-octadecanyl succinic anhydride. Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl monosubstituted succinic anhydride is selected from the group consisting of butylsuccinic anhydride, hexylsuccinic anhydride, heptylsuccinic anhydride, octylsuccinic anhydride, hexadecanyl succinic anhydride, and octadecanyl succinic anhydride.

In one embodiment of the present invention, the at least one monosubstituted succinic anhydride is one kind of alkyl monosubstituted succinic anhydride. For example, the one alkyl monosubstituted succinic anhydride is butylsuccinic anhydride. Alternatively, the one alkyl monosubstituted succinic anhydride is hexylsuccinic anhydride. Alternatively, the one alkyl monosubstituted succinic anhydride is heptylsuccinic anhydride or octylsuccinic anhydride. Alternatively, the one alkyl monosubstituted succinic anhydride is hexadecanyl succinic anhydride. For example, the one alkyl monosubstituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl monosubstituted succinic anhydride is octadecanyl succinic anhydride. For example, the one alkyl monosubstituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl monosubstituted succinic anhydride is butylsuccinic anhydride such as n-butylsuccinic anhydride.

In one embodiment of the present invention, the at least one monosubstituted succinic anhydride is a mixture of two or more kinds of alkyl monosubstituted succinic anhydrides. For example, the at least one monosubstituted succinic anhydride is a mixture of two or three kinds of alkyl monosubstituted succinic anhydrides.

In one embodiment of the present invention, the at least one monosubstituted succinic anhydride consists of succinic anhydride monosubstituted with one group being a linear or branched alkenyl group having a total amount of carbon atoms from C2 to C30, preferably from C3 to C20, and most preferably from C4 to C18 in the substituent.

The term "alkenyl" in the meaning of the present invention refers to a linear or branched unsaturated organic compound composed of carbon and hydrogen. Said organic compound further contains at least one double bond in the substituent, preferably one double bond. In other words, "alkenyl monosubstituted succinic anhydrides" are composed of linear or branched unsaturated hydrocarbon chains containing a pendant succinic anhydride group. It is appreciated that the term "alkenyl" in the meaning of the present invention includes both the cis and trans isomers.

In one embodiment of the present invention, the at least one monosubstituted succinic anhydride is at least one linear or branched alkenyl monosubstituted succinic anhydride. For example, the at least one alkenyl monosubstituted succinic anhydride is selected from the group consisting of ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, and octadecenyl succinic anhydride.

Accordingly, it is appreciated that, e.g., the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl monosubstituted succinic anhydride is selected from the group consisting of hexenylsuccinic anhydride, octenylsuccinic anhydride, hexadecenyl succinic anhydride, and octadecenyl succinic anhydride.

In one embodiment of the present invention, the at least one monosubstituted succinic anhydride is one alkenyl monosubstituted succinic anhydride. For example, the one alkenyl monosubstituted succinic anhydride is hexenylsuccinic anhydride. Alternatively, the one alkenyl monosubstituted succinic anhydride is octenylsuccinic anhydride. Alternatively, the one alkenyl monosubstituted succinic anhydride is hexadecenyl succinic anhydride. For example, the one alkenyl monosubstituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl monosubstituted succinic anhydride is octadecenyl succinic anhydride. For example, the one alkyl monosubstituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl monosubstituted succinic anhydride is linear octadecenyl succinic anhydride such as n-octadecenyl succinic anhydride. In another embodiment of the present invention, the one alkenyl monosubstituted succinic anhydride is linear octenylsuccinic anhydride such as n-octenylsuccinic anhydride.

If the at least one monosubstituted succinic anhydride is one alkenyl monosubstituted succinic anhydride, it is appreciated that the one alkenyl monosubstituted succinic anhydride is present in an amount of at least 95.0 wt.-% and preferably of at least 96.5 wt.-%, based on the total weight of the at least one monosubstituted succinic anhydride of step (e).

In one embodiment of the present invention, the at least one monosubstituted succinic anhydride is a mixture of two or more kinds of alkenyl monosubstituted succinic anhydrides. For example, the at least one monosubstituted succinic anhydride is a mixture of two or three kinds of alkenyl monosubstituted succinic anhydrides.

If the at least one monosubstituted succinic anhydride is a mixture of two or more kinds of alkenyl monosubstituted succinic anhydrides, one alkenyl monosubstituted succinic anhydride is linear or branched octadecenyl succinic anhydride, while each further alkenyl monosubstituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride, and mixtures thereof. For example, the at least one monosubstituted succinic anhydride is a mixture of two or more kinds of alkenyl monosubstituted succinic anhydrides, wherein one alkenyl monosubstituted succinic anhydride is linear octadecenyl succinic anhydride and each further alkenyl monosubstituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride, and mixtures thereof. Alternatively, the at least one monosubstituted succinic anhydride is a mixture of two or more kinds of alkenyl monosubstituted succinic anhydrides, wherein one alkenyl monosubstituted succinic anhydride is branched octadecenyl succinic anhydride and each further alkenyl monosubstituted succinic anhydride is selected from ethenylsuccinic anhydride, propenylsuccinic anhydride, butenylsuccinic anhydride, pentenylsuccinic anhydride, hexenylsuccinic anhydride, heptenylsuccinic anhydride, nonenylsuccinic anhydride, hexadecenyl succinic anhydride, and mixtures thereof.

For example, the at least one monosubstituted succinic anhydride is a mixture of two or more kinds of alkenyl monosubstituted succinic anhydrides comprising one or more hexadecenyl succinic anhydride, like linear or branched hexadecenyl succinic anhydride(s), and one or more octadecenyl succinic anhydride, like linear or branched octadecenyl succinic anhydride(s).

In one embodiment of the present invention, the at least one monosubstituted succinic anhydride is a mixture of two or more kinds of alkenyl monosubstituted succinic anhydrides comprising linear hexadecenyl succinic anhydride(s) and linear octadecenyl succinic anhydride(s). Alternatively, the at least one monosubstituted succinic anhydride is a mixture of two or more kinds of alkenyl monosubstituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

If the at least one monosubstituted succinic anhydride is a mixture of two or more kinds of alkenyl monosubstituted succinic anhydrides, it is appreciated that one alkenyl monosubstituted succinic anhydride is present in an amount of from 20.0 to 60.0 wt.-% and preferably of from 30.0 to 50.0 wt.-%, based on the total weight of the at least one monosubstituted succinic anhydride of step (e).

For example, if the at least one monosubstituted succinic anhydride is a mixture of two or more kinds of alkenyl monosubstituted succinic anhydrides comprising one or more hexadecenyl succinic anhydride(s), like linear or branched hexadecenyl succinic anhydride(s), and one or more octadecenyl succinic anhydride(s), such as linear or branched hexadecenyl succinic anhydride(s), it is preferred that the one or more octadecenyl succinic anhydride(s) is present in an amount of from 20.0 to 60.0 wt.-% and preferably of from 30.0 to 50.0 wt.-%, based on the total weight of the at least one monosubstituted succinic anhydride of step (e).

It is also appreciated that the at least one monosubstituted succinic anhydride may be a mixture of at least one alkyl monosubstituted succinic anhydrides and at least one alkenyl monosubstituted succinic anhydrides.

If the at least one monosubstituted succinic anhydride is a mixture of at least one alkyl monosubstituted succinic anhydrides and at least one alkenyl monosubstituted succinic anhydrides, it is appreciated that the alkyl substituent of the of at least one alkyl monosubstituted succinic anhydrides and the alkenyl substituent of the of at least one alkenyl monosubstituted succinic anhydrides are preferably the same. For example, the at least one monosubstituted succinic anhydride is a mixture of ethylsuccinic anhydride and ethenylsuccinic anhydride. Alternatively, the at least one monosubstituted succinic anhydride is a mixture of propylsuccinic anhydride and propenylsuccinic anhydride. Alternatively, the at least one monosubstituted succinic anhydride is a mixture of butylsuccinic anhydride and butenylsuccinic anhydride. Alternatively, the at least one monosubstituted succinic anhydride is a mixture of triisobutyl succinic anhydride and triisobutenyl succinic anhydride. Alternatively, the at least one monosubstituted succinic anhydride is a mixture of pentylsuccinic anhydride and pentenylsuccinic anhydride. Alternatively, the at least one monosubstituted succinic anhydride is a mixture of hexylsuccinic anhydride and hexenylsuccinic anhydride. Alternatively, the at least one monosubstituted succinic anhydride is a mixture of heptylsuccinic anhydride and heptenylsuccinic anhydride. Alternatively, the at least one monosubstituted succinic anhydride is a mixture of octylsuccinic anhydride and octenylsuccinic anhydride. Alternatively, the at least one monosubstituted succinic anhydride is a mixture of nonylsuccinic anhydride and nonenylsuccinic anhydride. Alternatively, the at least one monosubstituted succinic anhydride is a mixture of decyl succinic anhydride and decenyl succinic anhydride. Alternatively, the at least one monosubstituted succinic anhydride is a mixture of dodecyl succinic anhydride and dodecenyl succinic anhydride. Alternatively, the at least one monosubstituted succinic anhydride is a mixture of hexadecanyl succinic anhydride and hexadecenyl succinic anhydride. For example, the at least one monosubstituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one monosubstituted succinic anhydride is a mixture of octadecanyl succinic anhydride and octadecenyl succinic anhydride. For example, the at least one monosubstituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one monosubstituted succinic anhydride is a mixture of nonylsuccinic anhydride and nonenylsuccinic anhydride.

If the at least one monosubstituted succinic anhydride is a mixture of at least one alkyl monosubstituted succinic anhydrides and at least one alkenyl monosubstituted succinic anhydrides, the weight ratio between the at least one alkyl monosubstituted succinic anhydride and the at least one alkenyl monosubstituted succinic anhydride is between 90:10 and 10:90. For example, the weight ratio between the at least one alkyl monosubstituted succinic anhydride and the at least one alkenyl monosubstituted succinic anhydride is between 70:30 and 30:70 or between 60:40 and 40:60.

Optionally, at least one monosubstituted succinic acid and/or salt(s) thereof are provided according to step (e) of the inventive process.

It is appreciated that the expression "at least one" monosubstituted succinic acid means that one or more kinds of monosubstituted succinic acid may be provided in the process of the present invention.

Accordingly, it should be noted that the at least one monosubstituted succinic acid may be one kind of monosubstituted succinic acid. Alternatively, the at least one monosubstituted succinic acid may be a mixture of two or more kinds of monosubstituted succinic acid. For example, the at least one monosubstituted succinic acid may be a mixture of two or three kinds of monosubstituted succinic acid, like two kinds of monosubstituted succinic acid.

In one embodiment of the present invention, the at least one monosubstituted succinic acid is one kind of monosubstituted succinic acid.

It is appreciated that the at least one monosubstituted succinic acid represents a surface treatment agent and consists of succinic acid monosubstituted with an aliphatic group having a total amount of carbon atoms from C2 to C30 in the substituent.

In one embodiment of the present invention, the at least one monosubstituted succinic acid consists of succinic acid monosubstituted with an aliphatic group having a total amount of carbon atoms from C3 to C20 in the substituent. For example, the at least one monosubstituted succinic acid consists of succinic acid monosubstituted with an aliphatic group having a total amount of carbon atoms from C4 to C18 in the substituent.

It is appreciated that the at least one monosubstituted succinic anhydride and the at least one monosubstituted succinic acid may comprise the same or different substituent.

In one embodiment of the present invention, the succinic acid molecule of the at least one monosubstituted succinic acid and the succinic anhydride molecule of the at least one monosubstituted succinic anhydride are monosubstituted with the same group selected from an aliphatic group having a total amount of carbon atoms from C2 to C30, preferably from C3 to C20 and most preferably from C4 to C18 in the substituent.

If the at least one monosubstituted succinic anhydride is provided in combination with at least one monosubstituted succinic acid and/or salt(s) thereof, the at least one monosubstituted succinic acid and/or salt(s) thereof are present in an amount of less than 10.0 mol-%, based on the molar sum of the at least one monosubstituted succinic anhydride and the at least one monosubstituted succinic acid and/or salt(s) thereof. For example, the at least one monosubstituted succinic acid and/or salt(s) thereof are present in an amount of less than 5.0 mol-%, preferably less than 2.5 mol-%, and most preferably less than 1.0 mol-%, based on the molar sum of the at least one monosubstituted succinic anhydride and the at least one monosubstituted succinic acid and/or salt(s) thereof.

In one embodiment of the present invention, at least one monosubstituted succinic anhydride and at least one monosubstituted succinic acid and/or salt(s) thereof are used in the treatment step (e).

In the meaning of the present invention, salt(s) of the at least one monosubstituted succinic acid may be lithium, sodium, potassium, strontium, calcium, magnesium, and/or aluminum salt(s).

If at least one monosubstituted succinic anhydride and at least one monosubstituted succinic acid and/or salt(s) thereof are both used in step (e), the at least one monosubstituted succinic anhydride and the at least one monosubstituted succinic acid and/or salt(s) thereof are preferably provided as a blend.

Another requirement of the process according to the present invention is the total amount of the at least one monosubstituted succinic anhydride and the optional at least one monosubstituted succinic acid and/or salt(s) thereof used in treatment step (e). In general, said total amount may range from 0.01 to 10.0 wt.-%, based on the total dry weight of the calcium carbonate-containing material provided in step (a).

However, in order to reduce the total consumption of additives, it may be preferred to use a relatively small total amount of said at least one monosubstituted succinic anhydride and the optional at least one monosubstituted succinic acid and/or salt(s) thereof. Therefore, in one embodiment, the total amount of the at least one monosubstituted succinic anhydride and the optional at least one monosubstituted succinic acid and/or salt(s) thereof in step (e) may range from 0.01 to 5.0 wt.-%, based on the total dry weight of the calcium carbonate-containing material provided in step (a).

In another embodiment of the inventive process, the total amount of the at least one monosubstituted succinic anhydride and the optional at least one monosubstituted succinic acid and/or salt(s) thereof in step (e) ranges from 0.05 to 3.0 wt.-%, preferably from 0.1 to 2.0 wt.-%, and more preferably from 0.15 to 1.5 wt.-%, based on the total dry weight of the calcium carbonate-containing material provided in step (a).

Additionally or alternatively, it is to be noted that the at least one monosubstituted succinic anhydride and the optional at least one monosubstituted succinic acid of step (e) are liquid if provided at room temperature, i.e. said at least one monosubstituted succinic anhydride features a viscosity of less than 5'000 mPa·s, preferably of less than 2'500 mPa·s, more preferably of less than 1'000 mPa·s, and most preferably of less than 500 mPa·s at +20° C. (±2° C.), when measured with the appropriate equipment, e.g., Physica MCR 300 rheometer (Paar Physica) equipped with the measuring cell TEZ 150 P-C and the CC 28.7 measuring system at a shear rate of 5 s$^{-1}$ and at +20° C. (±2° C.).

Furthermore, the temperature at the beginning and also during treatment step (e) was found to be crucial in order to achieve the desired treatment results. Therefore, the temperature in treatment step (e) is adjusted to at least 2° C. above the melting point of the at least one monosubstituted succinic anhydride in order to achieve sufficient distribution of the treatment agent upon contacting same with the calcium carbonate-containing material.

In all cases where more than one monosubstituted succinic anhydride is used, the temperature in treatment step (e) may be adjusted to at least 2° C. above the melting point of the one having the highest melting point.

It has been found that optimal treatment results can also be achieved when the temperature in step (e) is adjusted to at least 2° C. above the melting point of the at least one monosubstituted succinic anhydride for only a limited period of time, for example, for less than 1 h, preferably less than 5 min, more preferably less than 1 min, and most preferably 1 to 10 s.

In a preferred embodiment, the temperature in step (e) is adjusted to at least 2° C. above the melting point of the at least one monosubstituted succinic anhydride for less than 1 h, preferably less than 5 min, more preferably less than 1 min, and most preferably 1 to 10 s directly after contacting the calcium carbonate-containing material with the at least one monosubstituted succinic anhydride and the optional at least one monosubstituted succininc acid and/or salt(s) thereof.

Additionally or alternatively, the temperature during the entire treatment step (e) lies within a certain range in order to achieve the desired treatment results, wherein said range also includes the temperature as described herein above with respect to the melting point of the at least one monosubstituted succinic anhydride. Therefore, in some embodiments of the process according to the present invention, the temperature during step (e) ranges from 30° C. to 200° C., preferably from 80° C. to 150° C., and more preferably from 110° C. to 130° C.

In another embodiment of the process according to the present invention, the calcium carbonate-containing material is preheated to the temperature defined in treatment step (e) for 1 to 30 min, preferably 2 to 20 min, and most preferably 5 to 15 min before contacting, in treatment step (e), the calcium carbonate-containing material with the at least one monosubstituted succinic anhydride and the optional at least one monosubstituted succinic acid and/or salt(s) thereof. In this respect, the temperature defined in step (e) may be a temperature of at least 2° C. above the melting point of the at least one monosubstituted succinic anhydride. The temperature adjusted by preheating may range from 30° C. to 200° C., preferably from 80° C. to 150° C., and more preferably from 110° C. to 130° C.

Depending on the order of steps, the preheating can be achieved by using the heat developed during dry grinding step (c). Additionally or alternatively, the preheating can be carried out in a separate step, for example in a mixer which may also be used to carry out treatment step (e).

To achieve an optimal treatment, it is also possible to store the surface-treated calcium carbonate-containing material at elevated temperatures for several hours or days, for example in a silo.

The present step of treating the calcium carbonate-containing material with at least one monosubstituted succinic anhydride and, optionally, with at least one monosubstituted succinic acid and/or salt(s) thereof may be carried out before and/or during and/or after dry grinding step (c).

According to one embodiment, the treatment step is carried out during and/or after dry grinding step (c).

During dry grinding the calcium carbonate-containing material in step (c), the grinding stock may become warm. Therefore, in cases where the treatment step (e) is carried out during or after grinding step (c), the warming of the grinding stock may be used to adjust the temperatures required for an optimal treatment according to process step (e). Independently from whether said treatment is carried out before, during or after grinding step (c), it is possible to add the at least one monosubstituted succinic anhydride and the optional at least one monosubstituted succinic acid and/or salt(s) thereof in one or more portions.

In cases where the treatment step is carried out during and after dry grinding, a first portion of the at least one monosubstituted succinic anhydride and the optional at least one monosubstituted succinic acid and/or salt(s) thereof are added to the mixture of step (c) and a second portion of the at least one monosubstituted succinic anhydride and the optional at least one monosubstituted succinic acid and/or salt(s) thereof are contacted with the calcium carbonate-containing material in a separate treatment step after grinding step (c).

According to another embodiment, treatment step (e) is carried out after dry grinding step (c).

It has to be noted that in all cases where said treatment step is carried out after dry grinding the calcium carbonate-containing material, it is generally possible to carry out said treatment step before or after classifying step (d). In the latter case, treatment step (e) represents the final process step yielding the mineral filler product according to the present invention.

Therefore, according to one embodiment, treatment step (e) may be carried out after dry grinding step (c) and before classifying step (d). Alternatively, treatment step (e) may be carried out after dry grinding step (c) and after classifying step (d).

The Mineral Filler Product

In the meaning of the present application, the inventive mineral filler product is a calcium carbonate-containing material which has been subjected to steps (a) to (e) as defined herein in the independent process claim. As already described above, said mineral filler product may be obtained after classifying step (d) or after treatment step (e), depending on the order of steps.

It was found that the use of at least one agent being a polyol during dry grinding step (c) may result in higher mill capacities and a higher throughput which requires lower investments and smaller plant footprints for equal production capacities while, simultaneously, the treatment layer formed in treatment step (e) was found to be of particular advantage with regard to the moisture pick up of the inventive mineral filler product.

The moisture pick up (measured as the moisture pickup susceptibility) of the inventive mineral filler product may be very low and can be expressed relative to a sample weight.

According to one embodiment, the mineral filler product has a moisture pick up susceptibility of less than or equal to 15.0 mg/g, preferably less than or equal to 12.0 mg/g, more preferably less than or equal to 8.0 mg/g, and most preferably less than or equal to 6.0 mg/g, wherein the moisture pick up susceptibility preferably has a lower limit of 0.1 mg/g.

According to another embodiment, the mineral filler product has a moisture pick up susceptibility ranging from 0.1 to 15.0 mg/g, preferably from 0.2 to 12.0 mg/g, more preferably from 0.5 to 10.0 mg/g, and most preferably from 0.6 to 8.0 mg/g.

In some particular cases as, for example, in case of high specific surface areas of the mineral filler product, the moisture pick up susceptibility may be suitably defined based on the specific surface area of said product (referred to as the normalized moisture pick up susceptibility).

According to one embodiment, the mineral filler product has a normalized moisture pick up susceptibility of less than or equal to 1.5 mg/m$^2$, preferably less than or equal to 1.0 mg/m$^2$, more preferably less than or equal to 0.5 mg/m$^2$, and most preferably less than or equal to 0.25 mg/m$^2$, based on the specific surface area of said product as measured by the BET nitrogen method, wherein the normalized moisture pick up susceptibility preferably has a lower limit of 0.01 mg/m$^2$, based on the specific surface area as measured by the BET nitrogen method.

The mineral filler product obtainable according to the present invention may have a specific surface area ranging from 0.5 to 20.0 m$^2$/g, preferably from 1.0 to 10.0 m$^2$/g, and more preferably from 2.0 to 8.0 m$^2$/g as measured by the BET nitrogen method.

The mineral filler product of the present invention can also be characterized by its particle size distribution.

In one embodiment, the mineral filler product has a weight median particle size $d_{50}$ ranging from 0.5 to 30.0 µm, preferably from 1.0 to 15.0 µm, and more preferably from 1.5 to 12.0 µm.

According to another embodiment, the mineral filler product has a weight median particle size $d_{50}$ ranging from 0.3 to 25.0 µm, preferably from 0.5 to 10.0 µm, more preferably from 1.0 to 8.0 µm, and most preferably from 1.2 to 5.0 µm.

In addition or alternatively to the foregoing weight median particle sizes, the mineral filler product may have a particle size topcut $d_{98}$ ranging from 1.5 to 50.0 µm, preferably from 2.0 to 30.0 µm, and more preferably from 2.5 to 15.0 µm.

In treatment step (e), a treatment layer is formed on at least part of the surface of the calcium carbonate-containing material. Therefore, said treatment layer may comprise the at least one monosubstituted succinic anhydride and/or reaction product(s) thereof and the optional at least one monosubstituted succinic acid and/or salt(s) thereof and/or reaction product(s) thereof in a total amount of from 0.01 to 2.0 wt.-%, preferably from 0.05 to 1.5 wt.-%, and more preferably from 0.1 to 1.0 wt.-%, based on the total dry weight of the calcium carbonate-containing material.

A "reaction product" in the meaning of the present invention is a compound resulting from the reaction of the at least one monosubstituted succinic anhydride or the optional at least one monosubstituted succinic acid with the calcium carbonate-containing material. Typically, said reaction product is a reaction product resulting from the reaction of the aforementioned treatment agents with the surface of the calcium carbonate-containing material.

In many cases, the reaction products of the at least one monosubstituted succinic anhydride or the optional at least one monosubstituted succinic acid are salty reaction products, e.g., lithium, sodium, potassium, strontium, calcium, magnesium and/or aluminum salts. The skilled person will appreciate that many reaction products resulting from the reaction of a monosubstituted succinic anhydride may be identical to those resulting from the reaction of a corresponding monosubstituted succinic acid and/or salt(s) thereof.

It has been found that in order to achieve optimal treatment results, it is also possible to store the treated calcium carbonate-containing material at elevated temperatures for several hours or days, for example in a silo. Upon silo storage, unreacted treatment agent may react with the calcium carbonate-containing material surface.

According to a further aspect, the inventive mineral filler product may be used in a polymer composition, in paper making, paper coatings, agricultural applications, paints, adhesives, sealants, construction applications, and/or cosmetic applications, preferably said mineral filler product is used in a polymer composition.

As the mineral filler product has a low moisture pick up susceptibility, it may advantageously be used in paper coatings in order to adjust the printing properties of a coated paper. Furthermore, the mineral filler product may also be used in exterior paints and bathroom paints which may lead to a reduction in mildew growth on surfaces being treated with such paints.

A number of the aforementioned applications (e.g., for coatings or paints) involve the preparation of an aqueous slurry comprising the mineral filler product obtainable by the process according to the present invention. Such aqueous slurries may be easily prepared from the inventive mineral filler product by the addition of water to obtain slurries having a solids content of, for example, from 10.0 to 85.0 wt.-%, based on the total weight of said slurry.

The use of the mineral filler product according to the present invention as a filler material in polymer applications may also be of particular advantage. For example, said filler may be used in thermoplastic polymers, such as polyvinyl chloride, polyolefins, and polystyrene which may allow an increased filler load as compared to conventional calcium carbonate fillers.

The polymer composition of the present invention may also be used in a number of processes including the manufacture of blown films, sheets, or pipe profiles, in processes such as extrusion of pipes, profiles, cables, filaments, fibres or the like, and in compression moulding, injection moulding, thermoforming, blow moulding, and rotational moulding, etc.

In this respect, said polymer composition may be directly used in the manufacture of polymer articles. In one embodiment of the present invention, the polymer composition comprises the mineral filler product in an amount of from 1.0 to 50.0 wt.-%, preferably of from 5.0 to 45.0 wt.-%, and most preferably from 10.0 to 40.0 wt.-%, based on the total weight of the polymer composition.

EXAMPLES

The scope and interest of the invention may be better understood on basis of the following examples which are intended to illustrate embodiments of the present invention. However, they are not to be construed to limit the scope of the claims in any manner whatsoever.

Example 1

Marble from Carrara, Italy was wet ground at 25 wt.-% solids content in tap water in a horizontal ball mill (Dyno-mill) and spray dried. The obtained calcium carbonate-containing material features a $d_{50}$ of approximately 1.7 μm, a topcut ($d_{98}$) of 5.0 μm, a specific surface area (BET) of 4.1 m²/g, and a total moisture content of 0.06 wt.-%.

This dry calcium carbonate was used to demonstrate the effect of a monosubstituted succinic anhydride on the moisture pickup of a mineral filler product. In order to simulate dry grinding in the presence of glycerol, the dry calcium carbonate was treated with 0.6 wt.-% of glycerol in a MTI mixer (MTI Mischtechnik International GmbH). The contents of the mixer were mixed at 120° C. under a stirring speed of 3,000 rpm for a period of 10 min.

The glycerol-containing calcium carbonate was subsequently divided in several aliquots and surface-treated with either stearic acid or alkenylsuccinic anhydride (HYDRORES AS 1000, commercially available from Kemira Oyj, Vaasa, Finland) in the MTI mixer. The glycerol-containing calcium carbonate was activated for 10 min at 120° C. and 3'000 rpm. Subsequently, the treatment agent was added and the blend was further mixed at 120° C. at a stirring speed of 3'000 rpm for a period of 10 min. The results are given in Table 1 below.

TABLE 1

Moisture pickup of dry ground calcium carbonate (n/d = not determined).

| Treatment agent [wt.-%] | Moisture pickup susceptibility [mg/g] | |
| --- | --- | --- |
| | Stearic acid (prior art) | Succinic anhydride (inventive) |
| 0.0 | 7.5 | |
| 0.3 | 6.2 | 6.3 |
| 0.4 | n/d | 6.4 |
| 0.5 | 6.6 | 6.1 |
| 0.6 | n/d | 5.7 |
| 0.8 | 6.3 | 4.8 |
| 1.0 | 6.0 | 4.4 |

Example 2

The effect of a reduced moisture pick is also observed in cases where the calcium carbonate contains more than one polyol.

Marble from Carrara, Italy was dry ground in a ball mill equipped with a classifier to produce a dry ground calcium carbonate with $d_{50}$ of 2 μm, a topcut ($d_{98}$) of 10 μm, and wherein 60 wt.-% of the particles have a particle size of below 2 μm. The total moisture content was 0.3 wt %. For the dry grinding process, 1'500 ppm of a blend (weight ratio 80:20) of glycerol and triisopropanolamine was used as dry grinding agent.

The dry ground calcium carbonate was subsequently divided in several aliquots and surface-treated with either stearic acid or alkenylsuccinic anhydride (HYDRORES AS 1000, commercially available from Kemira Oyj, Vaasa, Finland) in a MTI mixer (MTI Mischtechnik International GmbH). The dry ground calcium carbonate was activated for 10 min at 120° C. and 3'000 rpm. Subsequently, the treatment agent was added and the blend was further mixed at 120° C. at a stirring speed of 3'000 rpm for a period of 10 min. The results are given in Table 2 below.

TABLE 2

Moisture pickup of dry ground calcium carbonate.

| Treatment agent [wt.-%] | Moisture pickup susceptibility [mg/g] | |
| --- | --- | --- |
| | Stearic acid (prior art) | Succinic anhydride (inventive) |
| 0.0 | 5.52 | |
| 0.6 | 2.72 | 2.25 |
| 0.8 | 2.57 | 2.05 |

In both examples, a reduced moisture pickup as compared to prior art treatment methods using stearic acid can be observed while using glycerol as an agent being suitable to increase the grinding efficiency and throughput.

The invention claimed is:

1. A mineral filler product obtained by a process comprising the steps of:
    (a) providing a calcium carbonate-containing material;
    (b) providing at least one agent being a polyol;
    (c) dry grinding the calcium carbonate-containing material in a mixture comprising:
        (i) the calcium carbonate-containing material provided in step (a); and (ii) the at least one agent provided in step (b), in at least one grinding unit to obtain a dry ground calcium carbonate-containing material;

(d) classifying the dry ground calcium carbonate-containing material of step (c) to obtain one or more coarse fractions and one or more fine fractions, wherein one or more of the coarse fractions are removed and/or subjected to dry grinding step (c) and/or subjected to classifying step (d); and (e) treating the calcium carbonate-containing material before and/or during and/or after step (c) with at least one monosubstituted succinic anhydride and, optionally, with at least one monosubstituted succinic acid and/or salts thereof to obtain a calcium carbonate-containing material having a treatment layer on at least part of the surface of said material;

wherein the total amount of the at least one agent provided in step (b) ranges from 0.01 to 5.0 wt.-%, based on the total dry weight of the calcium carbonate-containing material provided in step (a);

the total moisture content in the mixture of step (c) is less than or equal to 5.0 wt.-%, based on the total weight of said mixture;

the total amount of the at least one monosubstituted succinic anhydride and the optional at least one monosubstituted succinic acid and/or salts thereof in step (e) ranges from 0.01 to 5.0 wt.-%, based on the total dry weight of the calcium carbonate-containing material provided in step (a); and the temperature in step (e) is adjusted to at least 2° C. above the melting point of the at least one monosubstituted succinic anhydride.

2. The mineral filler product according to claim 1, having a weight median particle size $d_{50}$ ranging from 0.3 to 25.0 µm.

3. The mineral filler product according to claim 1, having a weight median particle size $d_{50}$ ranging from 1.2 to 5.0 µm.

4. The mineral filler product according to claim 1, having a specific surface area ranging from 0.5 to 20.0 m$^2$/g as measured by the BET nitrogen method.

5. The mineral filler product according to claim 1, having a specific surface area ranging from 1.0 to 10.0 m$^2$/g as measured by the BET nitrogen method.

6. The mineral filler product according to claim 1, wherein the calcium carbonate-containing material provided in step (a) is obtained from a natural calcium carbonate source.

7. The mineral filler product according to claim 1, wherein the calcium carbonate-containing material is calcite, marble, limestone, chalk, dolomite, or any mixture thereof.

8. The mineral filler product according to claim 1, wherein the at least one agent provided in step (b) is a polyol selected from the group consisting of a saccharide, glycerol, polyglycerol, ethylene glycol, propylene glycol, oligomers and polymers of ethylene glycol and/or propylene glycol, and triisopropanolamine.

9. The mineral filler product according to claim 1, wherein the at least one agent is a polyol selected from glycerol and triisopropanolamine.

10. The mineral filler product according to claim 1, wherein the total amount of the at least one agent provided in step (b) ranges from 0.05 to 3.0 wt.-%, based on the total dry weight of the calcium carbonate-containing material provided in step (a).

11. The mineral filler product according to claim 1, wherein the total moisture content in the mixture of step (c) is less than or equal to 2.0 wt.-%, based on the total weight of said mixture.

12. The mineral filler product according to claim 1, wherein the total moisture content in the mixture of step (c) is less than or equal to 1.0 wt.-%, based on the total weight of said mixture.

13. The mineral filler product according to claim 1, wherein the at least one monosubstituted succinic anhydride of step (e) consists of succinic anhydride monosubstituted with an aliphatic group having a total amount of carbon atoms from C2 to C30.

14. The mineral filler product according to claim 1, wherein the at least one monosubstituted succinic anhydride of step (e) consists of succinic anhydride monosubstituted with an aliphatic group having a total amount of carbon atoms from C3 to C25.

15. The mineral filler product according to claim 1, wherein the at least one monosubstituted succinic anhydride of step (e) consists of succinic anhydride monosubstituted with an aliphatic group having a total amount of carbon atoms from C4 to C20.

16. The mineral filler product according to claim 1, wherein the at least one monosubstituted succinic anhydride of step (e) is at least one alkyl monosubstituted succinic anhydride.

17. The mineral filler product according to claim 1, wherein the at least one monosubstituted succinic anhydride of step (e) is at least one alkyl monosubstituted succinic anhydride selected from the group consisting of ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, and octadecanyl succinic anhydride.

18. The mineral filler product according to claim 1, wherein the at least one monosubstituted succinic anhydride of step (e) is at least one alkenyl monosubstituted succinic anhydride.

19. The mineral filler product according to claim 1, wherein the at least one monosubstituted succinic anhydride of step (e) is at least one alkenyl monosubstituted succinic anhydride selected from the group consisting of ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, and octadecenyl succinic anhydride.

20. The mineral filler product according to claim 1, wherein the temperature during step (e) ranges from 30° C. to 200° C.

21. The mineral filler product according to claim 1, wherein the temperature in step (e) is adjusted to at least 2° C. above the melting point of the at least one monosubstituted succinic anhydride for less than 1 h.

22. The mineral filler product according to claim 1, wherein the temperature in step (e) is adjusted to at least 2° C. above the melting point of the at least one monosubstituted succinic anhydride for less than 5 min.

23. The mineral filler product according to claim 1, wherein the total amount of the at least one monosubstituted succinic anhydride and the optional at least one monosubstituted succinic acid and/or salts thereof in step (e) ranges from 0.05 to 3.0 wt.-%, based on the total dry weight of the calcium carbonate-containing material provided in step (a).

24. The mineral filler product according to claim 1, wherein the total amount of the at least one monosubstituted succinic anhydride and the optional at least one monosubstituted succinic acid and/or salts thereof in step (e) ranges from 0.1 to 2.0 wt.-%, based on the total dry weight of the calcium carbonate-containing material provided in step (a).

25. The mineral filler product according to claim 1, wherein the total amount of the at least one monosubstituted succinic anhydride and the optional at least one monosubstituted succinic acid and/or salts thereof in step (e) ranges from 0.15 to 1.5 wt.-%, based on the total dry weight of the calcium carbonate-containing material provided in step (a).

26. The mineral filler product according to claim 1, wherein said treatment layer of step (e) comprises the at least one monosubstituted succinic anhydride and/or reaction product(s) thereof and the optional at least one monosubstituted succinic acid and/or salts thereof and/or reaction product(s) thereof in a total amount of from 0.01 to 2.0 wt.-%, based on the total dry weight of the calcium carbonate-containing material.

27. The mineral filler product according to claim 1, wherein said treatment layer of step (e) comprises the at least one monosubstituted succinic anhydride and/or reaction product(s) thereof and the optional at least one monosubstituted succinic acid and/or salts thereof and/or reaction product(s) thereof in a total amount of from 0.05 to 1.5 wt.-%, based on the total dry weight of the calcium carbonate-containing material.

28. The mineral filler product according to claim 1, wherein said treatment layer of step (e) comprises the at least one monosubstituted succinic anhydride and/or reaction product(s) thereof and the optional at least one monosubstituted succinic acid and/or salts thereof and/or reaction product(s) thereof in a total amount of from 0.1 to 1.0 wt.-%, based on the total dry weight of the calcium carbonate-containing material.

* * * * *